March 30, 1965     D. P. ROHRER ETAL     3,175,258
SHELL MOLD METHOD AND APPARATUS Filed Dec. 26, 1962     2 Sheets-Sheet 1

INVENTORS
DOUGLAS P. ROHRER
IRWIN J. LUBALIN
BY *Kenway, Jenney + Hildreth*

ATTORNEYS

FIG. 3
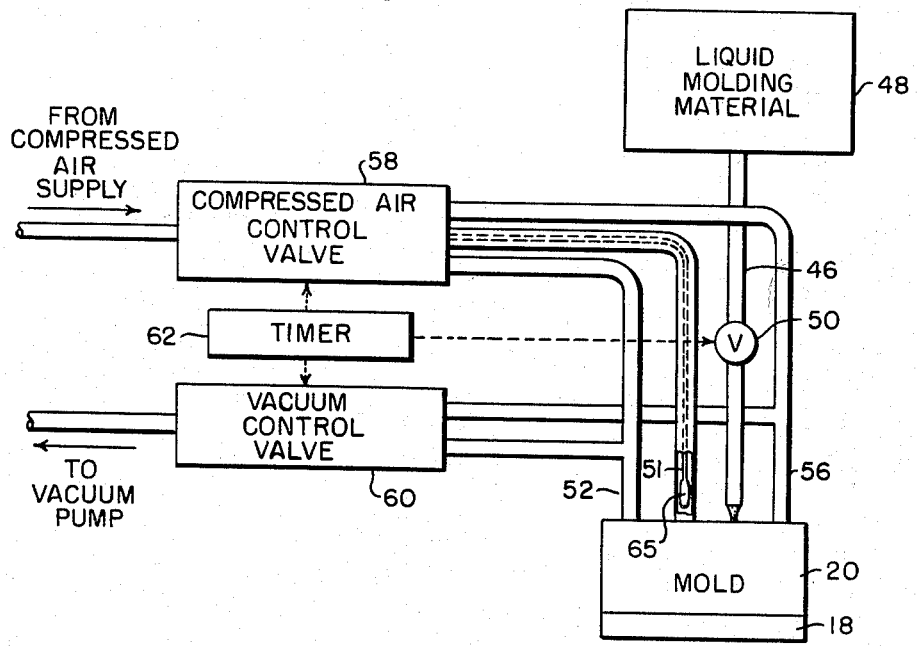
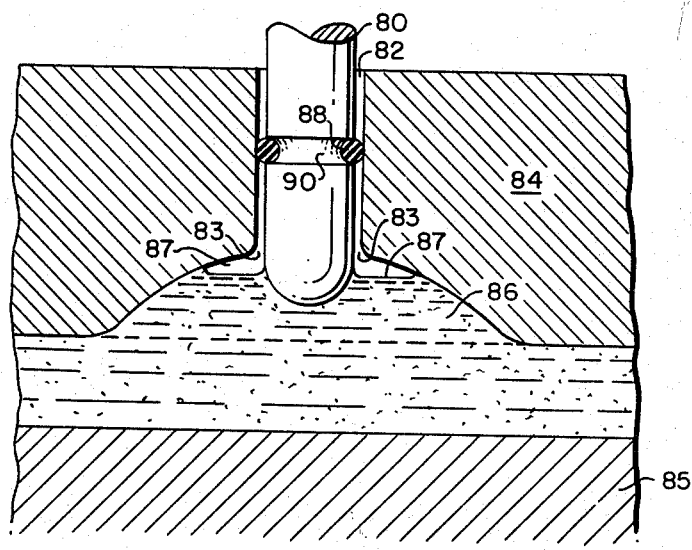
FIG. 4 under# United States Patent Office 3,175,258
Patented Mar. 30, 1965

3,175,258
SHELL MOLD METHOD AND APPARATUS
Douglas P. Rohrer, Melrose, Mass., and Irwin J. Lubalin, Rockville Centre, N.Y., assignors to British Industries Corporation, Avnet-Shaw Division, Plainview, N.Y., a corporation of New York
Filed Dec. 26, 1962, Ser. No. 247,037
14 Claims. (Cl. 22—34)

Our invention relates to the molding art and concerns a method of and an apparatus for enhancing the ease and efficiency of processing shell molds, and in particular concerns an improved means for a method of the formation, retention, and release of a shell mold from a molding cavity.

A common method for ejecting shell molds from a mold member has been to employ ejector pins. The ejector pins are disposed in one or more mold members so that one end of the pin is immersed in the shell mold material in the molding cavity between the male and female mold members. A grab hook is often used on the end of the ejection pin with larger or heavier shell molds to permit positive retention of the shell mold with one particular mold member when the mold is opened. Ejector pins have usually connected to a common strike plate. The ejection of the shell mold is accomplished by force applied against this common strike member. This arrangement usually employs a heavy C frame support, and a telescopic hydraulic cylinder on this support with a piston as a striking force. A plurality of slidably and extendably ejector pins are disposed in mold channels and connected to a common strike plate on one or more of the mold members. Ejector pins are relatively loosely mounted in mold channels to permit the escape of entrapped air as the molding material fills the mold cavity.

Ejection and retention with ejector pins has numerous disadvantages particularly when gellable ceramic slurries employed in the Shaw process, such as described in U.S. Patents 2,795,022 and 2,911,310, are employed as the molding material. These highly abrasive ceramic slurries in contact with the ejector pins accelerate pin wear and require continual pin maintainance or pin replacement. Further, the molding material such as metal or metal alloy, thermosetting or thermoplastic moulding material, gelable ceramic slurries, and the like often flow into and hardens within the ejector pin channels. This is particularly true when a number of pins are employed, the lower ends of which are disposed at different vertical levels within the mold cavity. Furthermore, the use of ejector pins either without or with grab hooks are not wholly satisfactory in providing a positive release of the shell. Thus, it is often difficult to retain the shell mold with a particular mold member even with the use of mold release agents, or to retain the shell with a particular mold member for a particular predetermined period of time. These disadvantages have inhibited the development of a continuous shell molding machine which requires positive sequential exactly timed operations. For example, with heavier shells the shell often falls immediately from the cope when the mold is open, while with lighter objects the shell often is unpredictably retained with one or the other mold members for an indefinite period of time.

It is therefore an object of our invention to provide an apparatus for and a method of inhibiting the flow of molding material into undesired mold member areas or apertures. It is a further object to simplify and to reduce the cost of the ejection and retention of shell molds thereby enhancing the efficiency of the shell molding operations. It is another object of our invention to eliminate the need for ejector pins and associated supporting equipment. Another object is to provide a means and a method for modifying ejector pins of conventional molds to permit some of the advantages of our invention to be obtained. Another object is to provide for the controlled retention and ejection of a shell mold with a predetermined mold member for predetermined time periods. It is a further object of this invention to provide for the better control of a shell mold thickness where multiple ejection channels and various shell mold levels are involved. Another object is to provide a positive timed sequential method of inhibiting the flow of materials into ejector channels, positive retention of the shell mold with a particular mold member, and the positive ejection of the shell from that mold member. Further objects and advantages of the present invention will be apparent to those skilled in the art from the foregoing description when read in conjunction with the accompanying drawings wherein:

FIGURE 3 is a schematic diagram illustrating one embodiment for forming, retaining and ejecting shell molds in accordance with our invention; and FIGURE 4 is a cross-sectional view of a modified ejector pin representing another embodiment of our invention.

We have discovered it is highly beneficial in the molding art and particularly with liquid gelable ceramic slurries of the Shaw process to provide sufficient fluid pressure to the mold channels to overcome the pressure or static head of the molding material as it is introduced into the mold cavity. Thus by entrapping or controlling the volume or the pressure of the air within the ejector channels of fluid impermeable mold members we can inhibit the flow of moldable material into undesired apertures such as the lower openings of the ejector channels. We find the level of the molding material in the cavity can be adjusted and controlled by the entrapment of air within the mold cavity with the control of either the entrapped air volume or by pressurizing or by a combination of both means. We prevent the flow of molding material into the ejector channels, and provide shell mold surface areas beneath these channel apertures which are particularly useful for subsequent retention and ejection of the shell mold. Further, we find that the shell mold member is characterized by suitable shell surface areas are positively retained with an particular mold member by the application of sub-atmospheric pressure; that is by the creation of vacuum conditions within the ejector channel. Furthermore, we have discovered that positive ejection of the shell mold member is obtained by the employment of a pressurized fluid to the same area.

One embodiment of our invention resides in the sequential entrapment of all or a portion of the air within a mold cavity and particularly within the ejector channel to inhibit the molding material from entering the lower apertures of the ejector channels and to create a suitable vacuum holding area; the creation of a vacuum on this area to retain the shell mold to a particular mold member upon opening of the mold; and the subsequent application of fluid pressure to this area to eject the shell mold from the open mold. In another embodiment of our invention we employ sealing means for the modification of present conventional mold members having ejector pins to permit the entrapment air within the mold cavity and within the ejector channel that is between the ejector channel and the molding material in the mold cavity.

Figure 1:
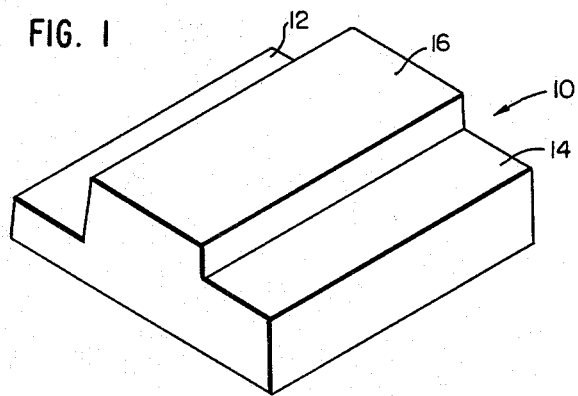
FIGURE 1 is an isometric view of an object to be shell molded the object characterized by a plurality of vertical height levels.

FIGURE 1 shows an object 10 to be shell molded, the object characterized by a plurality of vertical levels 12, 14 and 16. In the process of preparing a shell mold half for the object 10 a male mold member 18 serves as the drag and a female mold member 20 serves as a cope. The male and female mold members are shown disposed in a closed or molding position in a fluid tight cooperative engagement meeting at a mold parting line 22. These mold members present an intervening mold cavity 24 to provide an internal surface of the shell mold exactly conforming to the external surface of the object 10. The external surface of the shell mold member or the internal surface of the female mold member is of relatively smooth configuration approximately following that of the projecting male mold member 18 and is controlled in depth to provide a shell mold cavity of predetermined shell thickness such as a relatively uniform shell mold thickness. The male and female mold members are adapted for relative vertical reciprocal translatory movement both toward and away from one another from a mold opening position to a mold closing position such as from a vertical spatial position or an open mold position into an operative engagement position or a closed mold position. These mold members are often of die-type metal or other hard material capable of containing the molding material. The mold members are substantially impervious to the flow of fluids such as gas or air through the body of the mold members.

Figure 2:
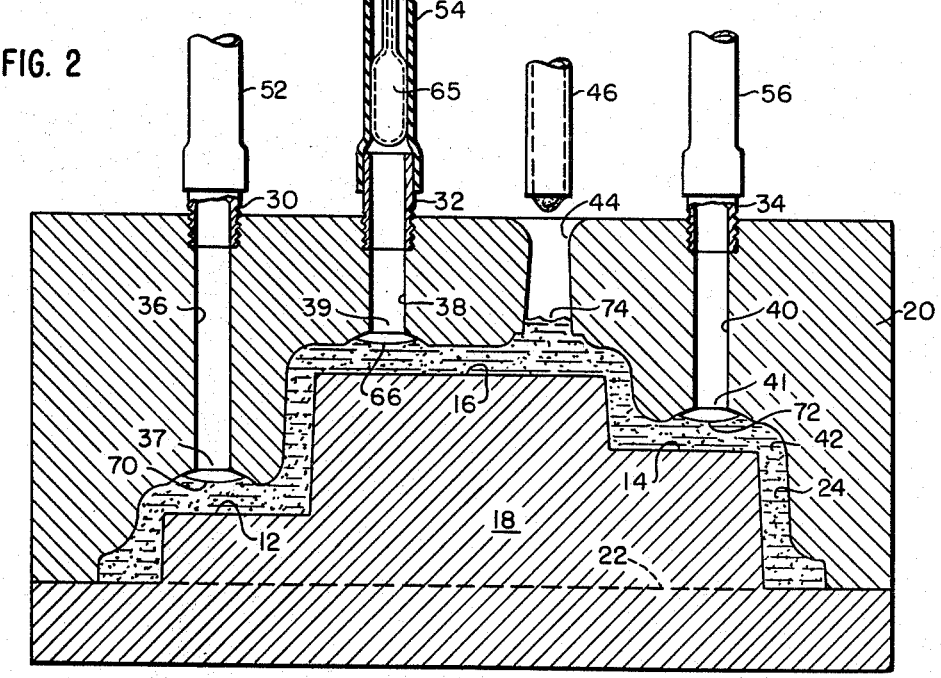
FIGURE 2 is a cross-sectional view of a shell mold of the object within a mold cavity being produced in accordance with the teachings of our invention.

In our embodiment illustrated in FIGURES 2 and 3 the ejector pins commonly employed with the cope 20 have been removed and valve members 30, 32 and 34 such as tire valve members without the valve seats, inserted in the top openings of tubular ejector channels 36, 38 and 40. These ejector channels are characterized by the one or upper end and another or lower end 37, 39 and 41 respectively, and provide fluid communication between the exterior of the cope 20 and the various internal vertical levels 12, 14 and 16 within the shell mold cavity 24. FIGURE 2 shows a molding material such as a gelable ceramic Shaw slurry 42 within the mold cavity with the liquid slurry being poured into the mold cavity through a sprue opening 44 from a slurry source 48 from a slurry inlet pipe 46 containing a solenoid operated fluid flow control valve 50.

The ejector channels are in fluid flow communication through external conduits 52, 54 and 56 with an electrically operated solenoid compressed air control valve 58 and a vacuum control valve 60 which are connected respectively to a source of compressed air and a vacuum pump (not shown). The vacuum control valve 60 can be a single control valve having open and closed positions. The compressed air control valve 58 schematically shown can be a single valve which controls the air pressure and air flow to each ejector channel or may be a series of individual valves to each individual ejector channel or conduit. The sequential predetermined timed opening and closing of the fluid flow control valve 58 and 60 as well as the slurry control valve 50 is accomplished in response to electrical impulses received from an electrical or mechanical action timer 62 such as an electrical multicam timer operatively connected to each solenoid valve. Of course if desired the operation of these valves can be accomplished by manual means.

Internally disposed within conduit 54, which is in communication with the upper mold level 16, there is slidably mounted an adjustable fluid valve sealing means comprising a flexible conduit such as a relatively thin wall rubber tube 64 capable of expansion and contraction upon the application and withdrawal of air pressure. This tube is in communication through control valve 58 to the source of air pressure. The valve is shown in the air sealing position that is; in an expanded condition at the lower end 65 thereof to effectively seal the conduit 54 by the application of positive pressure within the flexible sealing means 64 greater than the pressure within conduit 54. When the internal pressure is removed from flexible conduit 64 the conduit end 65 contracts to its normal longitudinal cylindrical shape to permit the passage of fluid in conduit 54. The internal valve sealing means is slidably adjusted within the conduit 54 to provide for the entrapment of a particular predetermined volume of air as required between the shell molding surface 66 and the sealing valve 65. It is also recognized that other suitable valve sealing means can be employed such as where the outer conduit 54 is a flexible rubber tube an adjustable or slidable uni-directional flow valve may be employed or a regular externally mounted pinch clamp may be employed at various locations to entrap a predetermined volume of air.

In FIGURE 2 the shell mold level or shell mold member thickness and surface at the other end of the ejector channels has been controlled by the application of pressure to the ejector channels or the entrapment of a suitable volume of air to provide a slightly depressed circular surface areas 66, 70 and 72 beneath the lower end of the ejector channels 36, 38 and 40. These holding areas have a greater surface area than the lower end openings of the ejector channel such as approximately from 1 to 3 times the surface area of the ejector channel lower opening area. This surface area is characterized by a slightly concave depression the extent of which is controlled by the air pressure exerted against the liquid molding material prior to its hardening.

In the operation of the embodiment represented, the two mold members 18 and 20 are placed in cooperatively engaging position in a firm fluid-tight mating manner. The liquid gelable rapidly hardenable alcohol base ceramic Shaw slurry 44 flows from a slurrysource 48 through conduit 46 by the opening of the valve 50 in response to a predetermined timing arrangement into the mold cavity 24 through the sprue opening 44. As the slurry pours into the shell mold cavity 24 the air previously within the cavity is gradually displaced by the slurry until the slurry level reaches the lower end 37 of the first ejector channel 36. At which time or before a positive air pressure aproximating the fluid pressure of the slurry is applied to the ejector channel 36 through activation of timer 62 which actuates control valve 58 and allows a predetermined air pressurizing of this ejector channel. The pressurizing of the ejector channels can also be accomplished with any inert gas or liquid that will not adversely react or combine with the molding material employed. Thus suitable material or fluids to be employed for pressurizing purposes would include gases such as air, nitrogen, steam, natural gas or the like or liquids such as water, oil, etc.

Pressure within the ejector channels is created either from an external source such as an air compressor or by the entrapment of air within the channels. The air pressure used should be sufficient even though the slurry may be injected under positive pressure to prevent the entry of the slurry into the lower end of the ejector channels, and preferably to provide a shell surface area greater than the area of the lower end of the ejector channel. The pressure then should be sufficient to about equal or be slightly greater than the static head of the fluid molding material. Where the molding material is a liquid being poured as shown the pressures required would be less than in those operations wherein the molding material is positively injected under pressure. The extent of the surface area depression in communication with the ejector channel will depend primarily upon the size of the object to be molded and the molding materials to be used. With small objects of low density molding material such as plastics this area may be small, while for larger objects with denser materials such as Shaw slurries or metals the molding area should be somewhat larger in order to provide a greater holding and ejection force.

The air pressure within the ejector channel should be sufficient to provide for the balancing of a hydrostatic head difference between the top surface of the depressed areas 66, 70 and 72 and the top surface of the slurry in the sprue opening 44. As the slurry continues to fill the mold cavity 24 the next lower opening 41 of ejector channel 40 is covered and this channel pressurized like channel 36. Less fluid pressure will be needed to inhibit the flow of slurry into the lower end 41 of this channel than the pressure used for opening 37 due to the difference in hydrostatic heads between these levels and the completely filled mold cavity. For purposes of illustration in both channels 52 and 56 the pressurization of the channels by external sources is employed rather than trapping air in the ejector channels to control the slurry level; however, air entrapment is also feasible with these channels. In this manner an air cushion is provided in these ejector channels which forms a relatively concave surface area 70 or 72 in lieu of the normally higher circumferential wall risers of molding material obtained when conventionally ejector pins are employed. This permits a slight saving on the amount of slurry employed, and more accurate control of the shell thickness together with a smoother external appearance of the shell mold.

As the slurry is continued to be poured through the sprue the internal sealing valve 64 is adjusted to a predetermined position within conduit 54 and air pressure is applied to the internal tube 64 causing the lower end 65 to expand and to meet the internal walls of conduit 54 in a fluid sealing engagement thereby entrapping the air between the rising liquid slurry surface and the sealing valve. The sealing valve 65 is normally predisposed within the conduit 54 to provide for the entrapment of a predetermined volume of air that is; sufficient air volume to serve as an air cushion or to provide sufficient air pressure upon compression by the slurry to prevent the slurry from entering the lower end 39 of ejector channel 54. This method of providing an air cushion can also be employed with channels 52 and 56 if desired by entrapping smaller volumes of air to provide the needed higher pressures. The entrapped air volume is employed to control the ultimate slurry level within the mold cavity. As will be apparent to those skilled in the art, proper shaping and projections on the internal surface of the cope member 20 will aid in damming up of the air within and about the lower end of the ejector channels. The slurry within the mold cavity is then permitted to gel and harden over a predetermined time period while channels 36, 38 and 40 remain pressurized.

After the molding material has become non-fluid or incapable of flow such as after it has properly set and hardened, the timer 50 actuates the pressure control valve 58 to depressurize the channels and to open the vacuum control valve 60 to place all the conduits 52, 54 and 56 in fluid flow communication with the vacuum source. When the sealing valve 65 is used the pressure on the internal tube 64 within channel 54 is removed to permit the channel to be placed in contact with the vacuum source. By this arrangement a vacuum holding force is provided against the relatively large surface areas of 66, 70 and 72 which effectively holds the shell mold member to the cope. Thereafter, upon the opening of the mold members in a spaced position relative to one another, the shell mold is retained with the cope.

Thereafter when the mold members are opened, the shell mold member is effectively and positively ejected after a predetermined time period by the timer 62 actuating control valve 58 to place conduits 52, 54 and 56 in fluid communication with the source of compressed air, thereby ejecting the mold member by the pressure of the air against the shell surfaces 70, 66 and 72. In our vacuum retention and air ejection methods a common vacuum pressure and common ejection pressure can be applied to each channel regardless of the lower channel level within the mold to simplify the retention and ejection method. However, it is also within the scope of our invention to employ particular pressures or vacuum conditions with particular conduits where the shell mold member is of a size or shape which creates particular retention or ejection problems. Of course the vacuum source and pressurized source can be the same source such as by the employment of the inlet vacuum and outlet pressure sides of an air pump. The method and apparatus described is particularly adapted to be employed to the continuous production of shell molds where a definite time period is required for the mold, retention and ejection cycles and positive timed action is required in each cycle.

In another embodiment of the invention more particularly illustrated in FIGURE 4, there is shown a conventional cylindrical ejector pin 80 slidably and extendably disposed in an ejector channel 82 having a lower end 83 located in mold member 84 which is in a closed mold engaging position with a mold member 85. The lower tapered end of the ejector pin 80 is slightly immersed in a molding material 86 located in the shell mold cavity. In this embodiment the molding material forms a surface area 87 beneath the lower end 83 of greater area than the end opening, and is prevented from entering the ejector channel 82 and hardening within the channel aperture by the employment of an O ring sealing gasket 88 disposed in a circumferential grooved recess 90 about the ejector pin 80. This O ring sealing gasket is disposed at a predetermined location along the cylindrical axis of the pin and within the ejector channel such as to entrap sufficient air between the molding material and the sealing gasket to provide a proper air cushion of suitable pressure.

By this embodiment, as a slurry is poured into the conventional mold the sealing gasket permits the entrapment of a predetermined volume of air to form an effective air cushion, thereby preventing the molding material from entering the lower end 83 of the ejector channel 82. The gaskets may comprise neoprene or other synthetic elastomeric sealing material. Where the ejector pins are disposed at particular mold levels the axial location of the sealing gasket on the pin is adjusted to provide for the entrapment of a smaller volume of air at the lower levels. This embodiment permits mold members having conventional ejector pins to be easily converted so as to obtain some of the advantages of our present invention. Although O ring sealing gaskets have been shown, it is also recognized that other sealing means may be employed to entrap air within the ejector channel. The ejector pin itself may be made of a suitable soft material such as soft metal or graphite and the like or be otherwise placed in a sealing relationship within the ejector channel with the control of volume of trapped air obtained by the particular configuration of the ejector channel.

There has thus been described an apparatus and method for improving the processing of shell molds permitting the improved formation, retention and ejection of a shell mold in a predetermined time manner.

What we claim is:

1. In a composite mold including a cope member and a drag member which form in a closed position a mold cavity, and which mold is characterized by at least one ejector channel having a one end opening into the mold cavity, the method of inhibiting the flowing of molding material into the ejector channel which method comprises: introducing a molding material into the mold cavity to form a shell mold; and providing sufficient fluid pressure within the ejector channel and mold cavity to prevent the introduction of the molding material into the one end of the channel.

2. A method as defined in claim 1 wherein the mold includes a plurality of ejector channels each having one end opening at various levels to the mold cavity which method includes: providing sufficient pressure to each ejector channel to inhibit the flow of molding material into the ejector channel at that particular level.

3. A method as defined in claim 1 wherein sufficient pressure is employed to provide a shell surface holding area about the end of the ejector channel which area is not in contact with the molding material and which area is greater than the area opening of the one end of the ejector channel.

4. A method as defined in claim 1 wherein sufficient pressure is provided by entrapping a predetermined volume of air within the mold to provide an air cushion of sufficient pressure upon compression by the introduction of the molding material to inhibit the flow of said material into the one end of the ejector channel.

5. In a mold comprising a cope and a drag and characterized by a shell mold cavity between the cope and the drag which cavity is adapted to contain a hardenable fluid molding material to form a shell mold member and in which the cope is characterized by an ejector channel having one end opening to the mold cavity the method of inhibiting the flow of the molding material from entering the ejector channel which method comprises: introducing a fluid hardenable molding material into the mold cavity and providing a sufficient gas pressure to approximately overcome the pressure of the liquid molding material at the one end of the ejector channel thereby inhibiting the molding material from flowing into the one end of the ejector channel.

6. A method as defined in claim 5 wherein the molding material is poured into the mold cavity and sufficient gas pressure is employed to overcome the hydrostatic pressure head of the molding material at the one end of the ejector channel.

7. A method as defined in claim 5 wherein the molding material is injected into the mold cavity under positive pressure and sufficient gas pressure is employed to overcome the injected pressure of the molding material at the one end of the ejector channel.

8. A method as defined in claim 5 which includes additionally: permitting the fluid material to harden into a shell mold member and thereafter placing the ejector channel in fluid flow communication with a vacuum creating source to provide for the vacuum retention of the shell mold to the cope when the cope and drag are in an opened spatial relationship.

9. A method as defined in claim 5 wherein the cope includes a plurality of ejector channels having ends opening to the mold cavity at various levels and wherein sufficient pressure is provided at each level to inhibit the flow of the molding material into the ends of the ejector channels.

10. An apparatus for the processing of shell molds which apparatus comprises in combination: a mold means comprising upper and lower mold members having a mold cavity between these mold members when in a mold closing position at least one of which members is characterized by at least one ejector channel one end of which terminates within the mold cavity and the other end of which terminates at the external surface of the mold; a source of fluid pressure; a source of sub-atmospheric pressure; conduit means connecting the source of pressure and the source of subatmospheric pressure to the other end of the ejector channel means; and control means to provide for the placing of the ejector channel in sequential communication with the pressure source, the vacuum source and the pressure source to provide for pressurizing of the ejector channel, the vacuum retention of the shell mold with a particular mold member, and the ejection of the shell mold from that member.

11. An improved method of processing shell molds which shell mold members are formed by a molding material in a mold cavity between upper and lower mold members at least one of the said upper mold members one characterized by at least one ejector channel having a one end opening to the mold cavity which method comprises: pouring a hardenable slurry material into the mold cavity; providing sufficient gas pressure within the ejector channel to prevent the slurry material from entering the lower end thereof and hardening therein; permitting the material to harden and form a shell mold; placing the ejector channel in communication with a vacuum source sufficient to retain the shell mold with the upper member when the mold is open; opening the mold; and thereafter ejecting the shell mold from the upper mold member.

12. A method as defined in claim 11 wherein the gas pressure is provided by entrapping air within the mold cavity and ejector channel.

13. A mold member capable of being placed in a closed mating position with another mold member to form a mold cavity for receiving molding material which mold member is characterized by an ejector channel having slidably and extendably disposed therein a loosely mounted ejector pin, and means to place the ejector pin in a fluid sealing engagement with the walls of the ejector channel, thereby providing for the entrapment of air within the mold cavity upon the introduction of a molding material.

14. A mold member as defined in claim 13 wherein the fluid sealing means includes a circumferential sealing gasket about the ejector pin.

References Cited by the Examiner

UNITED STATES PATENTS

| | | | |
|---|---|---|---|
| 2,230,778 | 2/41 | Flores. | |
| 2,497,098 | 2/50 | Schmid | 22—154 |
| 2,629,897 | 3/53 | Mahla | 22—94 |
| 2,843,896 | 7/58 | Rinella | 22—154 |
| 2,923,040 | 2/60 | Goodwin et al. | 22—94 |
| 3,050,807 | 8/62 | Cieremans | 18—2 |

MICHAEL V. BRINDISI, *Primary Examiner.*

MARCUS U. LYONS, CHARLES W. LANHAM, *Examiners.*